(12) United States Patent
Chen

(10) Patent No.: US 6,244,207 B1
(45) Date of Patent: Jun. 12, 2001

(54) BICYCLE GEAR SHIFT INDICATING DEVICE

(76) Inventor: Chieh-Yuan Chen, No. 31-15, Sec. 2, Chung Ping Road, Pei Tun Area, Taichung (TW)

( * ) Notice: Subject to any disclaimer, the term of this patent is extended or adjusted under 35 U.S.C. 154(b) by 0 days.

(21) Appl. No.: 09/323,958

(22) Filed: Jun. 2, 1999

(51) Int. Cl.$^7$ .............................. G01D 11/00; G01D 13/00
(52) U.S. Cl. ........................................... 116/28.1; 116/284
(58) Field of Search .................................... 116/28.1, 284, 116/285, 298, 302, 303; 74/502.2, 489

(56) References Cited

U.S. PATENT DOCUMENTS

| | | | |
|---|---|---|---|
| 3,972,247 | * 8/1976 | Armstrong | 74/489 |
| 4,270,481 | 6/1981 | Watarai . | |
| 5,044,213 | * 9/1991 | Nagano | 74/142 |
| 5,178,033 | * 1/1993 | Kund | 116/28.1 |
| 5,325,735 | 7/1994 | Nagano . | |
| 5,540,180 | * 7/1996 | Kataumi et al. | 116/28.1 |
| 5,601,001 | 2/1997 | Kawakami et al. . | |
| 5,609,064 | * 3/1997 | Abe | 116/28.1 |
| 5,632,226 | * 5/1997 | Huang et al. | 116/295 |
| 5,682,794 | * 11/1997 | Shibata | 74/489 |
| 5,732,598 | 3/1998 | Shoge et al. . | |
| 5,775,168 | * 7/1998 | Furuta | 74/489 |
| 5,791,195 | * 8/1998 | Campagnolo | 116/28.1 |
| 5,806,372 | * 9/1998 | Campagnolo | 116/28.1 |
| 6,042,132 | * 3/2000 | Suenaga et al. | 280/260 |

* cited by examiner

Primary Examiner—Jacob K. Ackun, Jr.
Assistant Examiner—Faye Francis
(74) Attorney, Agent, or Firm—Browdy & Neimark

(57) ABSTRACT

A bicycle gear shift indicating device is mounted on a bicycle handlebar which is in turn provided with an operating handle and a control cable. The device comprises a main body, a cable reel, an actuation set, a link member, and a gear shift levels indicator. The main body is provided with a slide portion and a window. The cable reel is rotatably mounted in the main body such that the cable reel is actuated by the operating handle, and that the cable reel is connected with the control cable. The cable reel is provided with an inclined surface. The actuation set has a slide portion, a link portion, an action member, and a spring for urging the action member to press against the inclined surface of the cable reel. The link member is actuated by the actuation set. The gear shift levels indicator is fastened with the link member and provided with a plurality of Arabic numerals designating the gear shift levels and corresponding in location to the window of the main body. As the operating handle is turned, the cable reel is actuated to by the control cable, thereby causing actuation set to displace to actuate the link member in such a manner that a gear shift numeral is seen through the window of the main body.

17 Claims, 2 Drawing Sheets

BICYCLE GEAR SHIFT INDICATING DEVICE

FIELD OF THE INVENTION

The present invention relates generally to a bicycle gear shifting system, and more particularly to a gear shift indicating device of the bicycle gear shifting system to provide a bicyclist with an easy identification of the gear shift level.

BACKGROUND OF THE INVENTION

The conventional bicycle gear shift indicating device is generally provided with a plurality of numerals which are intended to designate the gear shift levels and are printed or engraved on the rotary shell of the device. The marks of the shift numerals are susceptible to being gradually erased by the rubbing friction between the rotary shell and the hand of a bicyclist.

The U.S. Pat. No. 4,270,481 discloses a lever operating device for the bicycle gear-shifting system. The device is not entirely effective in design in that the size of the gear shift indicating member is dependent on the rotating size, and that the indicating member can not be therefore seen with ease by the bicyclist. Such a structural deficiency as described above is overcome by an invention which is disclosed in the U.S. Pat. No. 5,601,001. However, the latter invention is limited in design in that the size of the bicycle speed indicator is relatively large, and that the bicycle speed indicator is complexed in construction, and further that the bicycle speed indicator is prone to cause a visual error.

The U.S. Pat. Nos. 5,325,735 and 5,732,598 are intended to overcome the deficiencies of the prior art bicycle gear shift indicating devices as described above; nevertheless these two inventions are also not entirely effective in design in that the bicycle speed indicators of various sizes are required for different gear-shifting mechanisms and the indicating range of different speeds, thereby resulting in a substantial increase in cost of making the bicycle gear shift indicators as disclosed in the aforementioned two prior art references.

SUMMARY OF THE INVENTION

It is therefore the primary objective of the present invention to provide a bicycle gear shift indicating device which enables a bicyclist to identify the gear shift level with ease.

It is another objective of the present invention to provide a bicycle gear shift indicating device which is simple in construction and is cost-effective.

It is another objective of the present invention to provide a bicycle gear shift indicating device which is compatible with various gear shift operating mechanisms of the bicycle.

In keeping with the principle of the present invention, the foregoing objectives of the present invention are attained by a bicycle gear shift indicating device which is mounted on a bicycle handlebar which is in turn provided with an operating handle and a control cable. The device comprises a main body which is provided with a slide portion and a window. The device further comprises a cable reel, an actuating set, a link member, and a gear shift indicator. The cable reel is rotatably mounted in the main body such that the cable reel can be actuated by the operating handle to turn, and that the cable reel is connected with the control cable. The cable reel is provided with an inclined surface opposite to one side of the operating handle. The actuating set has a slide portion corresponding to the slide portion of the main body, a link portion and an action member urged by an elastic member to press against the inclined surface of the cable reel. The link member is located in the main body and actuated by the actuation set. The gear shift indicator is fastened with the link member and provided with a plurality of Arabic numerals designating the gear shift levels and corresponding in location to the window of the main body.

In operation, the operating handle is rotated so as to actuate the cable reel by the control cable. As a result, the actuation set is displaced to actuate the link member in such a manner that a gear shift numeral is seen through the window of the main body.

Preferably, the slide portion of the main body is a slide slot, whereas the slide portion of the actuation set is a slide rail.

The link portion of the actuation set is a rack. The link member is a gear which is engaged with the rack. The link portion of the actuation set may be a plastic strip, whereas the link member may be a friction wheel in contact with the plastic strip. The link portion of the actuation set may be a pivot while the link member is an arm which is fastened pivotally with the main body and the pivot of the actuation set. Moreover, the link portion of the actuation set may be a plastic strip, whereas the link member is a slide arm capable of cooperating with an idle wheel. The actuation set may be a spring.

The foregoing objectives, features, functions, and advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
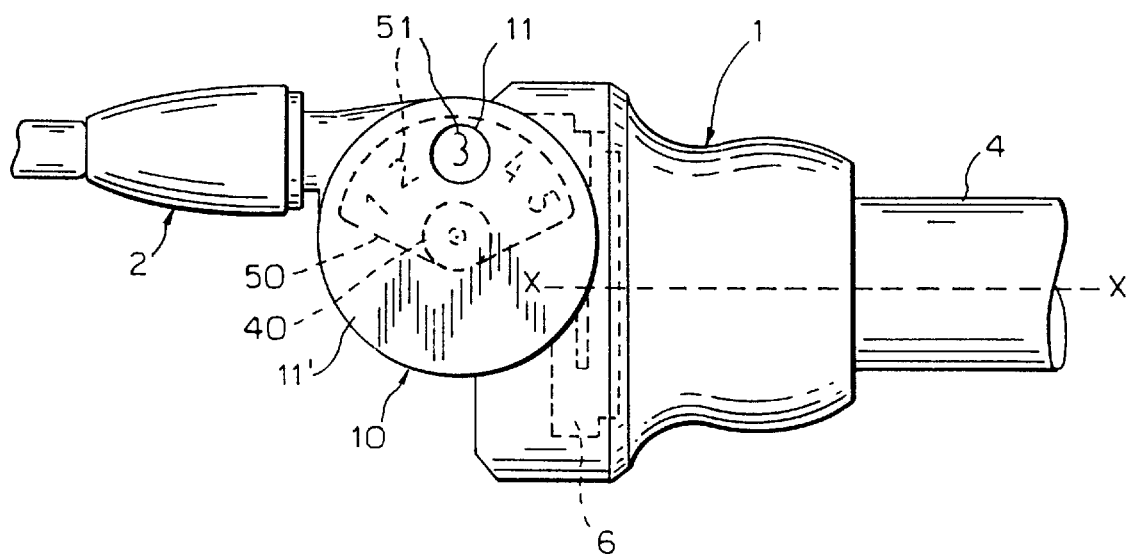
FIG. 1 shows a plan view of a first preferred embodiment of the present invention.
Figure 2:
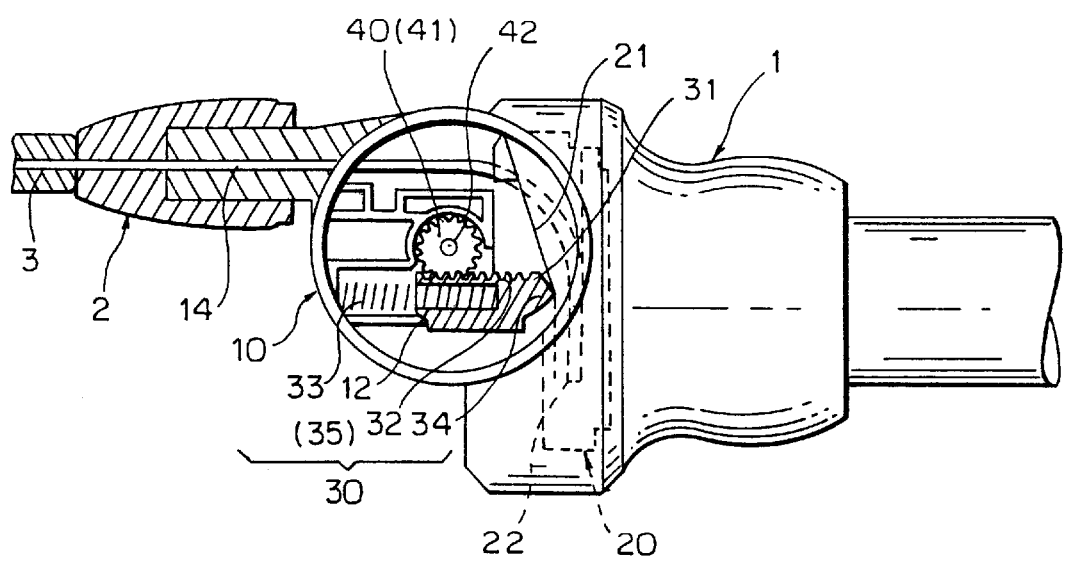
FIG. 2 shows a partial sectional view of the first preferred embodiment of the present invention.
Figure 3:
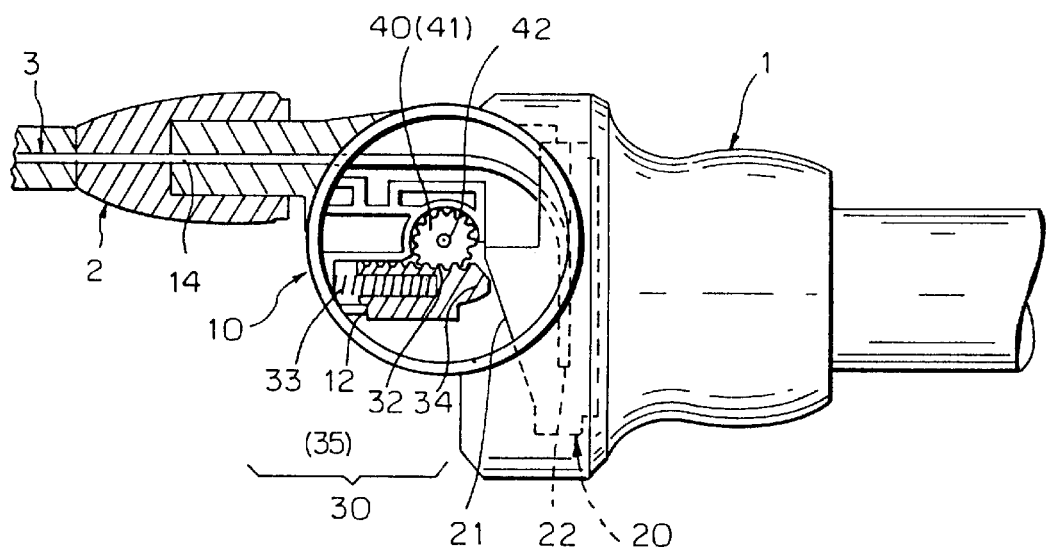
FIG. 3 shows a schematic view of the first preferred embodiment of the present invention at work.

As shown in FIGS. 1–3, a bicycle gear shift indicating device of the first preferred embodiment of the present invention is mounted on a bicycle handlebar such that the device is linked with an operating handle 1 which is provided at one end thereof with an adjustment button 2 and a control cable 3. The device of the present invention comprises a main body 10, a cable reel 20, an actuation set 30, a link member 40, and a gear shift indicator 50.

The main body 10 is of a shell-like construction and is fastened with the bicycle handlebar 4. The main body 10 is provided with a window 11, a slide slot 12 located in the interior thereof, a cable guiding hole 14, and a plurality of retaining portions (not shown in the drawings) located in the interior thereof The cable reel 20 is rotatably mounted in the main body 10 with a bottom wall 20' perpendicular to axis x—x of handlebar 4 and is provided with an inclined surface 21 opposite in location to the operating handle 1, a cable hole 22 for receiving the control cable 3, and a locating portion (not shown in the drawing) corresponding in location to the retaining portions of the main body 10.

The actuation set 30 is disposed in the interior of the main body 10 and is composed of a slide rail 35 corresponding in location to the slide slot 12 of the main body 10, an action member 31 having an urging end 34 capable of pressing against the inclined surface 21 of the cable reel 20, a rack 32 connected with the action member 31, and a spring 33 fastened with the action member 31.

The link member 40 is provided with a gear 41, and a spindle 42 fastened with the main body 10 for mounting pivotally the gear 41 which is engaged with the rack 32 of the actuation set 30.

The gear shift indicator 50 is fastened with link member 40 such that the indicator 50 moves along the link member 40. A plurality of Arabic numerals 51 are arranged circularly on the indicator 50 which is mounted rotatably on the spindle 42 of the link member 40. The numerals 51 are corresponding in location to a window 11 in outer wall 11 of the main body 10. Outer wall 11' is perpendicular to bottom wall 20' and extends over an edge 6 of the reel.

In operation, the operating handle 1 is rotated to actuate the cable reel 20 to turn, thereby resulting in the cable reel 20 being pulled by the control cable 3 in motion. In the meantime, the actuation set 30 is forced by the elastic force of the spring 33 to displace such that the urging end 34 of the actuation set 30 urges the inclined surface 21 of the cable reel 20, thereby resulting in the horizontal linear movement of the actuation set 30. As a result, the link member 40 is actuated to turn by the rack 32 of the actuation set 30 in motion. The indicator 50 is thus actuated by the link member 40 in motion to rotate such that a gear shift numeral 51 is seen through the window 11 of the main body 10.

Figure 4:
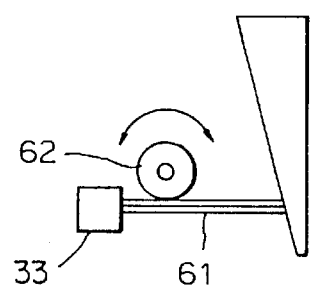
FIG. 4 shows a schematic view of a second preferred embodiment of the present invention at work.

As shown in FIG. 4, second preferred embodiment of the present invention a plastic strip 61 slidably engaged to the body 10 and, whereas the link member a friction wheel 62 which can be caused to turn by the plastic strip 61.

Figure 5:
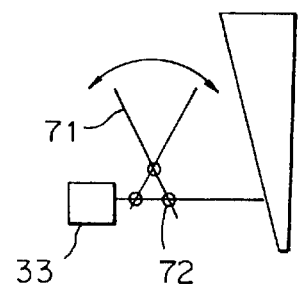
FIG. 5 shows a schematic view of a third preferred embodiment of the present invention at work.

As shown in FIG. 5, similarly the link member of the third preferred embodiment of the present invention is a rotary arm 71 which is fastened pivotally with the main body, whereas the actuation set has a pivot 72 pivoted with the rotary arm 71.

Figure 6:
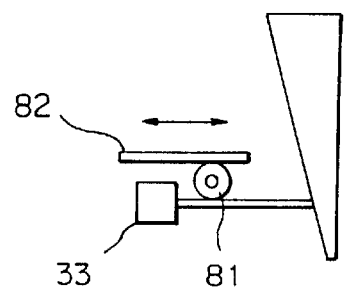
FIG. 6 shows a schematic view of a fourth preferred embodiment of the present invention at work.

As shown in FIG. 6, the link portion of the actuation set of the fourth preferred embodiment of the present invention is a plastic strip slidably engaged the body to, whereas the link member is a slide arm 82 and an idle wheel 81 rotatably engaged to body 10. In the meantime, the main body is provided with a slide slot (not shown in the drawing) in which the slide arm 82 slides, wherein and change "for actuating" to actuates idle wheel 81 for actuating the slide arm 82 to move linearly.

Figure 7:
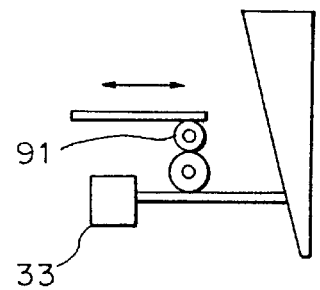
FIG. 7 shows a schematic view of a fifth preferred embodiment of the present invention at work.

Now referring to FIG. 7, the fifth preferred embodiment of the present invention is basically similar in construction to the fourth preferred embodiment of the present invention, with the only difference being that the former is provided with an idle wheel 91 which is located between the idle wheel 81 and the slide arm 82 for bringing about the action different in direction from the action of the latter.

The operating handle of the present invention has the gear-shifting mechanisms of various types. The cable reel of the present invention may be made integrally with the operating handle. As a result, the scope of the application of the present invention is broadened.

It is therefore readily apparent that the device of the present invention has advantages over the devices of the prior art. In the first place, the device of the present invention is applicable to the bicycles of various models and having various gear-shifting systems. The device of the present invention is designed in conformity with the mechanics of human body such that a visual error is minimized. In addition, the device of the present invention is mounted on the outer portion of the bicycle gear shifting mechanism such that the device can be accommodated in a greater space, and that the device can be provided with a greater viewing range. The device of the present invention is versatile in design to enhance the marketability of the device. For example, the numerals 51 of the indicator 50 may be arranged circularly or linearly.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A bicycle gear shift indicating device mounted on a bicycle handlebar and engaged to an operating handle, wherein the operating handle is rotatably engaged around the bicycle handlebar to operate a control cable for shifting gears, said device comprising:

a main housing body fixed to the bicycle handlebar;

a cable reel located in said main housing body fixed to said rotatable handle;

said cable reel having an inclined surface and being rotatable around and perpendicular to a longitudinal axis of the handlebar;

the main housing body having a window on an upper side thereof;

a link member rotatably mounted in said main housing body;

a first gear shift indicator fixed to said link member having a plurality of numerals each indicating a selected gear shift level; and a spring-biased actuating means slidably engaged in said main housing body to engage the inclined surface and the link member for rotating the link member when the inclined surface is rotated with the cable reel by turning the operating handle around the handlebar to display one of said numerals in said window.

2. The device according to claim 1, wherein said actuating means is a spring-biased rack slidably engaged on the main housing body and the link member is a gear which engages said rack.

3. The device according to claim 1, wherein the actuating means is a spring biased plastic strip slidably engaged to the main housing body and the link member is a friction wheel engaged to be rotated by the plastic strip.

4. The device according to claim 1, wherein said actuating means is a spring-biased pivot slidably engaged to the main housing body and wherein the link member is a rotary arm having the pivot rotatably fastened at one end thereof.

5. The device according to claim 1, wherein said actuating means is a spring-biased plastic strip slidably engaged to the main housing body and the link member is at least one idle wheel which linearly moves a slide arm slidably engaged to the main housing body.

6. The device according to claim 5, wherein the link member is two idle wheels engaged between the plastic strip and the slide arm.

7. The device as defined in claim 5, wherein said numerals of said indicator are arranged on the flat gear shift indicator along the circumference of a circle having a center which is the rotational center of said link member.

8. The device as defined in claim 5, wherein said numerals on the flat gear shift indicator are arranged linearly such that said numerals are parallel to a moving direction of said slide arm.

9. A bicycle gear shift indicating device mounted on a bicycle handlebar and engaged to an operating handle, wherein in the operating handle is rotatably engaged around the bicycle handlebar to operate a control cable for shifting gears;

said device comprising:
   a housing having a window and being fixed to the bicycle handlebar;
   a cable reel located in said housing being fixed to the rotatable handle;
   the cable reel being rotatable around and substantially perpendicular to a longitudinal axis of the handle bar and having an inclined surface opposite a bottom wall thereof;
   a flat indicator having a plurality of gear shift numbers fixed to a link member rotatably engaged in the housing; and
   a spring-biased actuating means slidably engaged in the housing to engage the inclined surface and the link member for rotating the link member to display one of the gear shift numbers in the window of the housing when the operating handle is rotated.

10. The device according to claim 9, wherein said actuating means is a spring-biased rack slidably engaged on the main housing body and the link member is a gear which engages said rack.

11. The device according to claim 9, wherein the actuating means is a spring biased plastic strip slidably engaged to the main housing body and the link member is a friction wheel engaged to be rotated by the plastic strip.

12. The device according to claim 9, wherein said actuating means is a spring-biased pivot slidably engaged to the main housing body and wherein the link member is a rotary arm having the pivot rotatably fastened at one end thereof.

13. The device according to claim 9, wherein said actuating means is a spring-biased plastic strip slidably engaged to the main housing body and the link member is at least one idle wheel which linearly moves a slide area slidably engaged to the main housing body.

14. The device according to claim 13, wherein the link member is two idle wheels engaged between the plastic strip and the slide arm.

15. The device as defined in claim 13, wherein said numerals of said indicator are arranged on the flat gear shift indicator along the circumference of a circle having a center which is the rotational center of said link member.

16. The device as defined in claim 13, wherein said numerals on the flat gear shift indicator are arranged linearly such that said numerals are parallel to a moving direction of said slide arm.

17. The device as defined in claim 1, wherein the upper side is substantially perpendicular to a bottom wall of the cable reel and extends over an outer edge of the cable reel.

* * * * *